Aug. 23, 1966  J. J. KLINIKOWSKI  3,268,713
ELECTRONIC COUNTERS
Filed March 25, 1963  2 Sheets-Sheet 1

INVENTOR.
JAMES J. KLINIKOWSKI
BY Robert A. Green
ATTORNEY

Aug. 23, 1966     J. J. KLINIKOWSKI     3,268,713
ELECTRONIC COUNTERS
Filed March 25, 1963     2 Sheets-Sheet 2
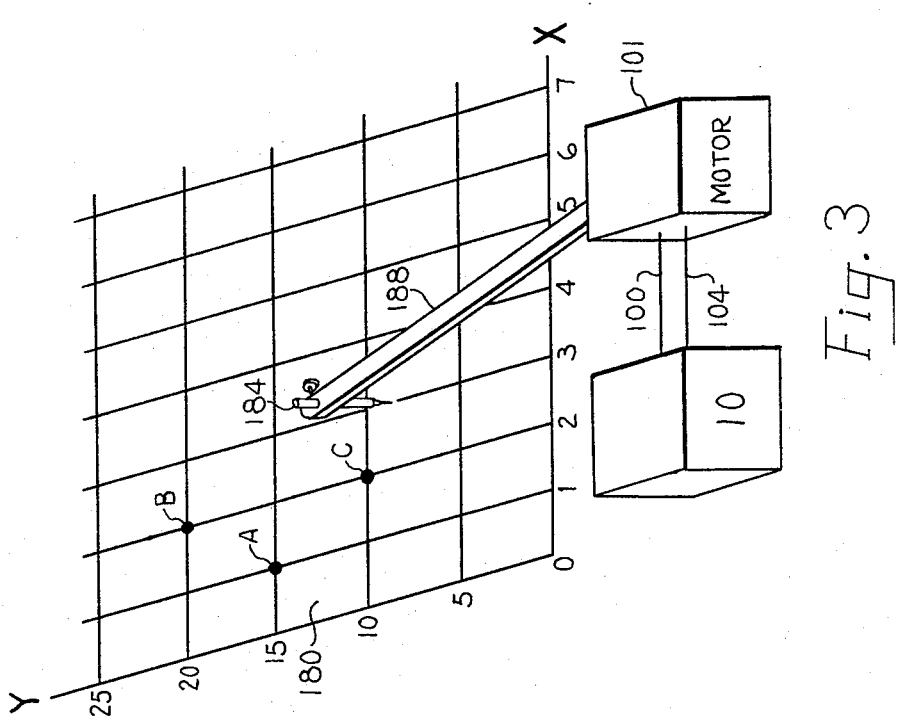
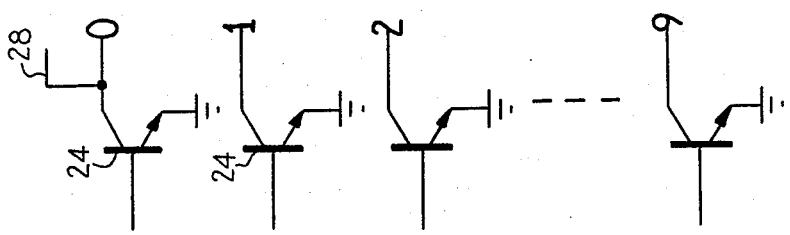
INVENTOR.
JAMES J. KLINIKOWSKI
BY
Robert A. Green
ATTORNEY

United States Patent Office 3,268,713
Patented August 23, 1966

3,268,713
ELECTRONIC COUNTERS
James J. Klinikowski, Somerville, N.J., assignor to Burroughs Corporation, Detroit, Mich., a corporation of Michigan
Filed Mar. 25, 1963, Ser. No. 267,410
14 Claims. (Cl. 235—92)

This invention relates to electronic counting systems and particularly to differential counters.

A differential counter, according to the present invention is one which is adapted to accept successive groups of input counting pulses and provide, as an output, a group of pulses which represent the arithmetic difference between the two separate groups of pulses. As successive groups of pulses are applied, a new difference is established, and a new group of pulses which represents this difference is provided. These pulses may be used, for example, to drive a digital motor, or they may be used in any other suitable manner.

Briefly, the system of the invention includes two counting circuits, one, a reversible storage counter, and the other, a reversible differential counter, both of which are coupled through gates to a source of clock pulses. Initially, both counters contain zero count as a reference state. A source of input pulses is also coupled to both counters and is adapted to enter pulses in the forward direction in the storage counter and in the reverse direction in the differential counter. A trigger then causes the clock pulse source to be connected to the differential counter and to provide sufficient pulses to return the differential counter to its reference zero count state. These pulses appear as a useful output and represent the difference between the number of input pulses and the prior (zero count) state of the differential counter. When the differential counter returns to its prior reference state, it causes the clock pulse source to be connected to the storage counter and to transmit a sufficient number of pulses into the storage counter to return it to the zero reference state. This same number of pulses is fed into the differential counter where it remains as the difference between the applied pulses and the previous balance present in the differential counter. Each successive group of input pulses causes the same cycle to be executed, with the storage counter showing zero count at the end of the cycle and the differential counter showing a count equal to the numerical difference between the previous balance and each new group of pulses.

The objects of the present invention concern the provision of an improved counting system and count registering system which provides a true count difference or balance at the end of each counting operation. The objects of the invention also concern the provision of such a circuit in relatively simple form and made up of a plurality of relatively simple building blocks.

In the drawing:

FIG. 2 is a schematic representation of a portion of a circuit which may be included in the system of FIG. 1; and FIG. 3 illustrates one arrangement for using the system of the invention.

Figure 1:
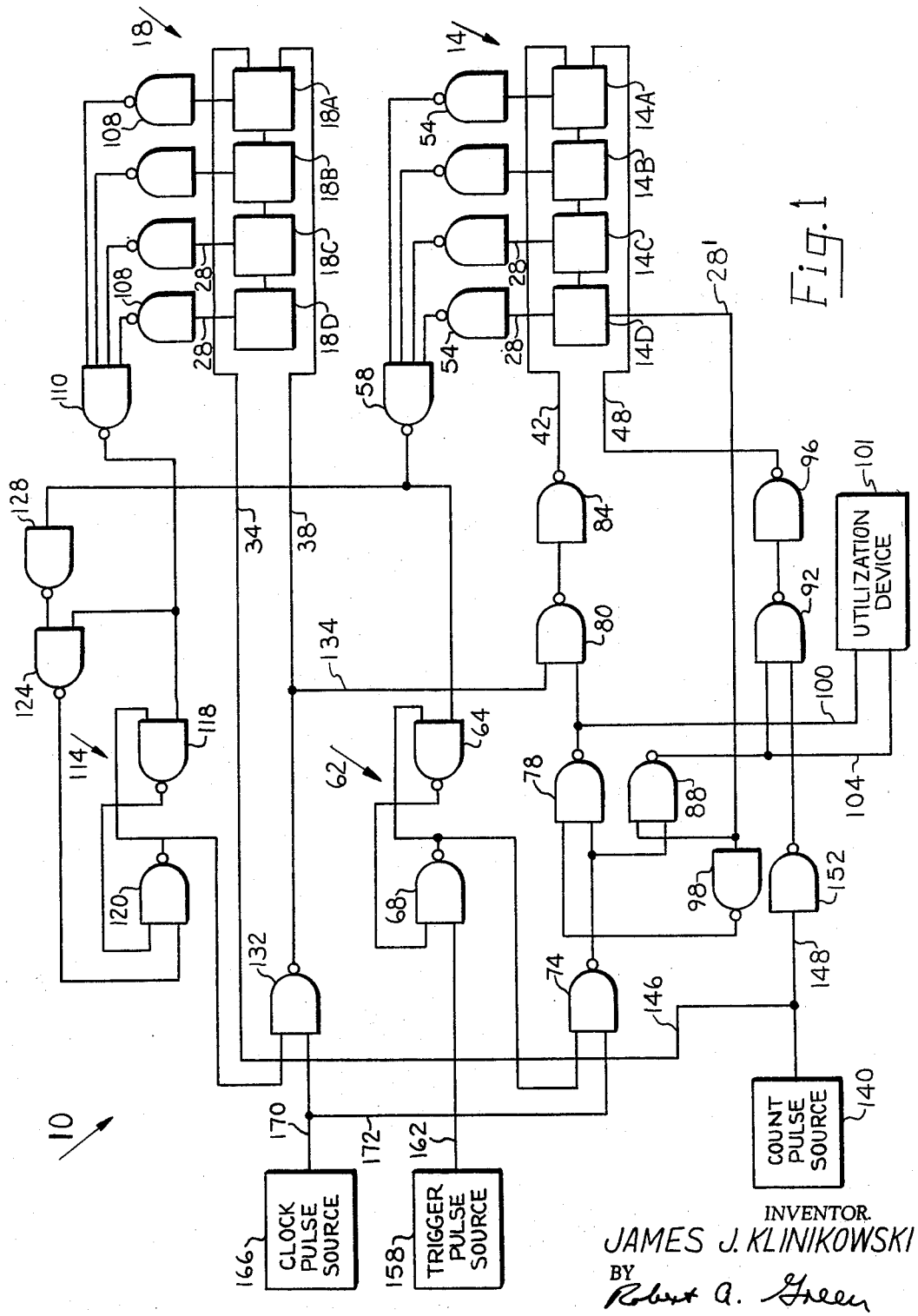
FIG. 1 is a schematic representation of a system embodying the invention.

As set forth above, the system of the invention is adapted to receive successive groups of pulses or counts and provide a group of output pulses which represent the arithmetic difference between two successive groups of counting pulses. The system can also store and provide a visual representation of the difference count. The many uses too which such a system can be put will be clear to those skilled in the art, and reference will be made to such uses below. First, the system shown in FIG. 1 will be described.

Referring to FIG. 1, the system of the invention 10 includes a differential counter circuit 14 and a storage counter circuit 18. Each counter circuit includes one or more series-connected counter modules 14A, 14B, 14C, 14D and 18A, 18B, 18C, 18D, respectively, which are of a type capable of counting in forward and reverse directions. In actual practice, each counter circuit 14 and 18 might include four counter modules, as shown, for representing units, tens, hundreds, and thousands of counts. However, a larger or smaller number of counter modules might be used. Counter modules, of the type useful in circuit 10, are well known and need not be shown in complete detail. A portion of a typical counter module is shown in FIG. 2. Such a circuit, when used as a decade counter, includes ten count registering devices 24 such as transistors, each of which comprises a counting stage, with the output of each counting stage being connected to a suitable visual indicator or display device.

One suitable visual indicator is the 6844-A cold cathode indicator tube which contains ten cathode numbers, including numerals "0" to "9", inclusive. The numerals are cold cathode electrodes, and glow is produced when a suitable potential is connected between a cathode and the tube anode (not shown). As shown in FIG. 2, the output of the transistor 24 representing zero count in each module is connected to the "0" glow cathode, the output of the transistor representing a count of one is connected to the glow cathode numeral "1," etc. In each counter module, the output of the zero count transistor is also provided with an auxiliary output lead 28 for a purpose to be described. In addition, the nine count transistor of the counter module 14D is provided with an auxiliary output lead 28'. In each counter circuit 14 and 18, each counter module is suitably coupled to the next counter module in the series to properly carry the count from one counter to the next. A forward count input line 34 and a reverse count input line 38 are coupled to counter circuit 14 for applying forward and reverse counting pulses thereto, and a similar forward count input line 42 and a reverse count input line 48 are coupled to counter circuit 18.

The circuit of the invention utilizes a plurality of conventional inverting NOR gates or NAND gates which operate with "1" and "0" signal logic levels. In the embodiment of the invention described below, a logical "1" signal or level represents a positive potential of about 6 volts, and a logical "0" signal or level represents a potential of zero volts. Those skilled in the art will understand that other signal levels and logic arrangements may be used in practicing the invention. The NAND/NOR gates have a single output, and they may have two, three, or more inputs as required. With gates of this type and with the selected logic levels, a "0" level at the input of a gate provides a "1" level at the output, and no additional "0" or "1" inputs can change the state of the gate. Such a gate is in a blocked state.

For convenience, henceforth, the NAND/NOR gates will be designated simply as gates. Referring to counter circuit 14, the lead 28 from each of the counter modules 14A, B, C, and D is coupled to the input of a separate gate 54, and the output of each of the gates 54 is coupled to the input of a single gate 58. The output of gate 58 is coupled to a flip-flop 62 which includes gates 64 and 68. The output of gate 58 is coupled to the input of gate 64, and the output of gate 54 is coupled to the input of gate 68. The output of gate 68 is coupled to the input of gate 64 and to the input of a master control gate 74. The output of gate 74 is coupled to the input of gate 78, the output of which is coupled through gates 80 and 84 to the forward count input line 42 to counter module 14. The output of gate 74 is also coupled to the input of gate 88, the output of which is coupled through gates 92 and 96 to the reverse count input line 48 to counter circuit 14. The lead 28' is connected both to the input of gate 88 and to the input of gate 98, the output of which is coupled to the input of gate 78.

The output of gate 78 is coupled by lead 100 to any suitable utilization device. The output of gate 88 is coupled by lead 104 to any suitable utilization device 101. For example, the output which appears on lead 100 might be used to drive a motor in one direction, and the output which appears on lead 104 might be used to drive the motor in the opposite direction.

The output 28 from each of the counter modules 18A, 18B, 18C, 18D of counter module 18 are coupled to separate gates 108, the outputs of which are coupled to the input of a single gate 110. The output of gate 110 is coupled to a flip-flop 114 including gates 118 and 120, with the output of gate 110 being coupled to the input of gate 118 and the output of gate 118 being coupled to the input of gate 120. The output of gate 120 is coupled to the input of gate 118. The output of gate 110 is also coupled to the input of gate 124, the output of which is coupled to the input of gate 120, and the output of gate 58 is coupled to the input of gate 128, the output of which is coupled to the input of gate 124. The output of gate 120 is also coupled to the input of a master control gate 132, the output of which is coupled both to the reverse count input line 28 of counter module 18 and by lead 134 to the input of gate 80 which is coupled through gate 84 to the forward count input line 42 of counter module 14.

A source 140 of input counting pulses 142 is coupled through lead 146 to the forward count input line 34 of counter circuit 18 and by lead 148 to the input of gate 152, the output of which is coupled through gates 92 and 96 to the reverse count input line 48 of counter 14. A source 158 of trigger pulses 160 is coupled by lead 162 to the input of gate 68, and a source 166 of clock pulses 168 is coupled by lead 170 to the input of gate 132 and by lead 172 to the input of gate 74.

The count pulses 142 and the clock pulses 168 have a logical "1" level, and the trigger pulses 160 have a logical "0" level.

In operation of the circuit of FIG. 1, initially, input pulse source 140 is not energized, trigger pulse source 158 is not energized, but clock pulse source 166 provides a continuous flow of clock pulses 168 at any suitable frequency, for example, 20 kc. per second. It is assumed that at this time the counter modules 14A, B, C, D and 18A, B, C, D are in a reference state in which they register zero count. Thus, each of the leads 28 connected to the output of the zero count registering device 24 in each module carries a "0" logic level. Now, referring to the storage counter circuit 18, the input to each of the gates 108 is at a "0" logic level, and the output of each of these gates is at a "1" logic level. Thus, gate 110 carries a "1" logic level on each of its input lines and a "0" logic level at its output. This "0" level at the output of gate 110 is coupled to the input of gate 118, with a resultant logic "1" level at the output of gate 118 and to the input of gate 120. This provides a "0" logic level at the output of gate 120 and to the input of gate 132. Thus, gate 132 is blocked and does not pass clock pulses 168 which are generated by source 166.

Referring now to differential counter circuit 14, since all of the leads 28 are at a "0" logic level, the output of each of the gates 54 is at a "1" logic level, and the output of gate 58 is at a "0" logic level. The "0" level at the output of gate 58 is coupled to the input of gate 64 of flip-flop 62, and the resultant "1" level output of gate 64 is coupled to the input of gate 68. This provides a "0" level at the output of gate 68, and this "0" level is coupled to the input of gate 74 which is thus blocked and does not pass clock pulses from source 166.

Assuming that the first operation of the system utilizes a group of fifteen counts, then fifteen pulses are applied by source 140 through lead 146 to the forward count input line of counter circuit 18 and through lead 148 and gates 152, 92, and 96 to the reverse count input line 48 of counter circuit 14. Thus, counter circuit 18 reads, from left to right in FIG. 1, "0015" and counter module 14 reads "9985." The entry of these fifteen counts in the counter circuits 14 and 18 does not change the blocked state of gates 74 and 132 so that clock pulses 168 do not enter either of the counters.

Next, a trigger pulse 160 is applied on lead 162 to the input of gate 68. Since the trigger pulse is at a "0" logic level, then the output of gate 68 is now at a "1" logic level, and this "1" logic level applied to the input of gate 74 opens gate 74 and allows clock pulses to pass through this gate. At this time, it should be noted that the presence of a count of "9" in the counter 14D provides a "0" logic level on lead 28' to the input of gate 88 which is thus blocked. Thus, in effect, the path through gate 88 to the reverse count input line 48 to counter circuit 14 is blocked. Thus, clock pulses which pass through gate 74 must also pass through gate 78 and gates 80 and 84 to the forward count input line 42 of counter 14. These clock pulses, since they enter counter 14 in a forward direction, drive the counter to the reference zero count state in which, as described above, the flip-flop 62 blocks counter 74 and no additional clock pulses can enter. At this time, the counter 14 reads "0000." The fifteen pulses which passed through gate 74 and gate 78 to return the counter 14 to the reference state also passed through output lead 100 to the utilization device 101.

When the differential counter 14 is returned to the zero count reference state and a "0" logic level appears at the output of gate 58, this "0" level is coupled to the input of gate 128, and the resultant "1" logic level at the output of gate 128 is coupled to the input of gate 124. The resultant "0" logic level at the output of gate 124 is coupled to the input of gate 120 of flip-flop 114, and the "1" logic level which then appears at the output of gate 120 opens gate 132. Now clock pulses 168 can pass through gate 132 to reverse count input line 38 of counter module 18 and through lead 134 through gates 80 and 84 to the forward count input line 42 of counter 14. Gate 132 allows fifteen pulses to pass through and enter counters 14 and 18, at which time the counter 18 reaches the "0" count reference level and, as described above, sets the flip-flop 114 to block the gate 132. At this time, the counter 18 reads "0000," and the counter 14 reads "0015." This is the termination of the first cycle of operation, and it should be noted that storage counter 18 carries zero count and differential counter 14 carries a count of "15" which represents the number of counting pulses 142 applied to the system and to the utilization device.

Now, for the second cycle of operation, let it be assumed that a group of twenty counts is to be applied to the system. Before the cycle is begun, it should be noted that the storage counter circuit reads "0000" and the differential counter, as a result of the previous operation, reads "0015." Next, twenty input pulses are applied from source 140 on forward count input line 34 to storage counter 18 and on line 148 through gates 152, 92, and 96 to the reverse count input line 48 of differential counter 14. After this operation, the counter 18 reads "0020," and the counter 14 reads "9995." Now the trigger source 158 is operated to apply a "0" level to the input of gate 68 of flip-flop 62 to cause the flip-flop to change state and open gate 74.

This allows clock pulses 168 to enter gate 74. Since a count of nine is present in counter module 14D, gate 88 is blocked, as described above, and the clock pulses must flow from gate 74 through gates 78, 80, and 84 to the forward count input line 42 of counter 14. Five clock pulses are permitted to enter counter 14 to raise it to the zero count reference state in which the flip-flop 62 blocks gate 74. These five pulses are also transmitted through lead 100 to the utilization device 101 to operate on the utilization device in addition to the fifteen pulses previously applied. As described above, the zero output of gate 58 operates through gates 128 and 124 to cause flip-flop 114 to open gate 132. With gate 132 open, clock pulses pass through the gate and through lead 38 to cause counter 18 to count in the reverse direction to the zero count reference level. Twenty clock pulses are required and are admitted to perform this operation. These twenty clock pulses are also transmitted through lead 134 and gates 80 and 84 and through forward count input line 42 to the counter 14. The counter 14 now registers twenty counts in the forward direction and reads "0020." Thus, the second cycle of operation is terminated, and the new balance is retained in counter 14A.

Let it be assumed now that, after the first cycle of fifteen counts has been completed, the next operation calls for the application of ten pulses to the system. It should be noted that, before this operation is performed, the storage counter 18 reads "0000" and the differential counter 14 reads "0015" and gates 132 and 74 are blocked. Now, ten pulses are applied by source 140 in the forward direction in counter 18 and in the reverse direction in counter 14. Thus, counter 18 now reads "0010" and counter 14 reads "0005." Next, a trigger pulse from source 158 is applied to flip-flop 62 to cause this flip-flop to open gate 74. Gate 74 can now pass clock pulses to counter 14. It should be noted that, since counter module 14D carries a zero count, the lead 28' from the "9" counter stage thereof carries a "1" logic level. Thus, gate 88 is open. The "1" logic level on lead 28' provides "0" logic output at gate 98, and this appears at the input of gate 78 which is thus blocked. Since gate 78 is blocked, the path from gate 74 to the forward count input line of counter 14 is blocked. Thus, when gate 74 is opened and clock pulses pass therethrough, the clock pulses pass through gates 88 and gates 92 and 96 and through the reverse count input line 48 to the counter 14. Five clock pulses are admitted to return the counter 14 to the zero reference state, at which time gate 58 sets flip-flop 62 to block gate 74. These five pulses also pass through lead 104 to the utilization device.

At this time, the "0" level output at gate 58 acts through gates 128 and 124 to set flip-flop 114 to open gate 132. When gate 132 opens, clock pulses enter counter 18 in the reverse direction to raise the counter to the zero count reference level. Ten clock pulses are required for this operation. When the counter 18 is returned to the zero count level, gate 110 operates flip-flop 114 to block gate 132. The ten pulses which returned counter 18 to the zero count state also passed through lead 134 and gates 80 and 84 to enter counter 14 in the forward direction. Thus, the counter 14 now reads "0010." This is the end of the cycle, and differential counter 14 carries a count which represents the last applied count of ten, and the utilization device has received a count which represents the difference between the ten count and the previous fifteen count.

As pointed out above, the system of the invention may be used to perform a wide variety of operations. For example, if utilization device 101 is a reversible motor and lead 100 is connected to means for driving the motor in one direction and lead 104 is connected to means for driving the motor in the opposite direction, then the system 10 can be used to automatically drive the motor by different controllable amounts in forward and reverse directions. In addition, this operation can be controlled by a recorded program represented by pulse source 140. The motor, of course, can be used to drive many different types of apparatus.

For example, the entire system 10, including a reversible motor as the utilization device 101, can be used in a two-dimensional curve plotting system as shown in FIG. 3. Such a system includes a recording medium 180 on which a series of points is to be plotted by a pen 184. The pen is mounted on a suitable carrier 188 which is adapted to be moved horizontally along the X axis by hand or by a motor (not shown) and vertically along the Y axis by motor 101.

In operation of the system shown in FIG. 3, first, the pen carrier 188 is positioned at the first division along the X axis. As described above, if the first mark is to be made at a point representing fifteen units along the Y axis, then fifteen pulses are fed into the circuit associated with system 10 from source 140, and the resultant fifteen pulses which appear on lead 100 coupled to motor 101 cause the motor to drive the pen 184 vertically by fifteen units. The pen is caused to make a mark at this point A. After this first operation is completed as described above, the carrier 188 is moved to the next division on the X axis, and, if a mark is to be made representing twenty units along the Y axis, then the second operation described above is performed, and the resultant five pulses which appear on output lead 100 cause the motor 101 to drive the pen upwardly by five additional units. The pen thus is in position to provide a mark at a point B representing twenty units along the Y axis.

If, as described above, the second operation required the marking of a point C ten units along the Y axis, then the third operation described above would be performed, and the motor 101 would be driven in the reverse direction and the carrier 188 and pen 184 would be driven downwardly by five divisions to the point C representing ten units along the Y axis.

In this way, as the pen carrier 188 is moved incrementally along the X axis, a series of points can be marked at different distances along the Y axis. These points mark out a curve representing the input program to the system 10.

What is claimed is:
1. An electronic counting and count utilizing system including
   a first counter circuit having forward and reverse count input lines,
   a second counter circuit having forward and reverse count input lines,
   a source of program pulses coupled to the reverse input line of the first counter and to the forward input line of the second counter to apply separate groups of program counts thereto,
   a clock pulse source, a first gate, and a second gate,
   said clock pulse source being coupled to said first and second gates with said first and second gates being normally closed to said clock pulse source,
   said first gate being coupled to said first counter and to a utilization device,
   said second gate being coupled to said first counter and to said second counter,
   and a trigger means coupled to said first gate to open it and permit the clock pulse source to transmit pulses through it to said first counter and to said utilization device,
   said first counter being coupled to said second gate to open it and permit the clock pulse source to transmit pulses to the second counter to drive it to zero count and to the first counter to drive it to the applied program count.
2. The system defined in claim 1 wherein said first gate is coupled through separate paths to both the forward input line and reverse input line of the first counter,
   and means are coupled to said separate paths for blocking one or the other and thereby allowing clock pulses to pass through only one path at a time.
3. The system defined in claim 1 wherein said first gate is coupled through separate paths to both the forward input line and reverse input line of the first counter, and gate means are coupled to said separate paths for blocking one or the other and thereby allowing clock pulses to pass through only one path at a time.

4. The system defined in claim 1 wherein said first gate is coupled through separate paths to both the forward input line and reverse input line of the first counter, and means are coupled from said first counter through gate means to said separate paths for blocking one or the other and thereby allowing clock pulses to pass through only one path at a time.

5. The system defined in claim 1 wherein said first gate is coupled through separate paths to both the forward input line and reverse input line of the first counter, said first counter having a plurality of counting stages, one of which is coupled through gate means to said separate paths for blocking one or the other and thereby allowing clock pulses to pass through only one path at a time.

6. The system defined in claim 1 wherein said first gate is coupled through separate paths to both the forward input line and reverse input line of the first counter, said first counter having a plurality of counting modules each including ten counting steps with the nine-counting step of one module being coupled through gate means to said separate paths for blocking one or the other and thereby allowing clock pulses to pass through only one path at a time to said first counter circuit.

7. An electronic counting and count utilizing system including a first counter circuit having forward and reverse count input lines, a second counter circuit having forward and reverse count input lines, a source of program pulses coupled to the reverse input line of the first counter and to the forward input line of the second counter to apply separate groups of program counts thereto, a first primary gate coupled through two paths including auxiliary gates to the forward and reverse input line of said first counter circuit, a second primary gate coupled to the reverse count input line of said second counter and to the forward count input line of said first counter circuit, a clock pulse source coupled to said first and second primary gates with said first and second primary gates being normally closed to said clock pulse source, said first primary gate being coupled both to said first counter circuit and to a utilization device, and a trigger pulse source coupled to said first primary gate to open it and permit the clock pulse source to transmit pulses through it to said first counter circuit and to said utilization device, said first counter circuit being coupled to said second gate to open it and permit the clock pulse source to transmit pulses to the second counter circuit to drive it to zero count and to the first counter circuit to drive it to the applied program count.

8. An electronic counting and count utilizing system including a first counter circuit having forward and reverse count input lines, a second counter circuit having forward and reverse count input lines, a source of program pulses coupled through a plurality of gates to the reverse input line of the first counter and directly to the forward input line of the second counter to apply separate groups of program counts thereto, a first primary gate coupled through two paths including auxiliary gates to the forward and reverse input line of said first counter circuit, a second primary gate coupled directly to the reverse count input line of said second counter and through gate means to the forward count input line of said first counter circuit, a clock pulse source coupled to said first and second primary gates with said first and second primary gates being normally closed to said clock pulse source, said first primary gate being coupled both to said first counter circuit and to a utilization device, and a trigger pulse source coupled to said first primary gate to open it and permit the clock pulse source to transmit pulses through it to said first counter circuit and to said utilization device, said first counter circuit being coupled to said second gate to open it and permit the clock pulse source to transmit pulses to the second counter circuit to drive it to zero count and to the first counter circuit to drive it to the applied program count.

9. An electronic counting and count utilizing system including a first counter circuit having a plurality of counting steps and forward and reverse count input lines, a second counter circuit having a plurality of counting steps and forward and reverse count input lines, a source of program pulses coupled to the reverse input line of the first counter and to the forward input line of the second counter to apply separate groups of program counts thereto, a first primary gate coupled through two paths including auxiliary gates to the forward and reverse input line of said first counter circuit, a first control flip-flop gate coupled between one of the counting steps of the first counter circuit and said first primary gate to control the state thereof, a second primary gate coupled to the reverse count input line of said second counter and to the forward count input line of said first counter circuit, a second control flip-flop gate coupled between one of the counting steps of said second counter circuit and said second primary gate to control the state thereof, a clock pulse source coupled to said first and second primary gates with said first and second primary gates being normally closed to said clock pulse source, said first primary gate being coupled both to said first counter circuit and to a utilization device, and a trigger pulse source coupled to said first primary gate to open it and permit the clock pulse source to transmit pulses through it to said first counter circuit and to said utilization device, said first counter circuit being coupled to said second gate to open it and permit the clock pulse source to transmit pulses to the second counter circuit to drive it to zero count and the first counter circuit to drive it to the applied program count.

10. An electronic counting and count utilizing system including a first counter circuit having a plurality of counting steps and forward and reverse count input lines, a second counter circuit having a plurality of counting steps and forward and reverse count input lines, a source of program pulses coupled to the reverse input line of the first counter and to the forward input line of the second counter to apply separate groups of program counts thereto, a first primary gate having an output coupled through to paths including auxiliary gates to the forward and reverse input lines of said first counter circuit, a first control flip-flop gate having an input coupled to one of the counting steps of the first counter circuit and an output coupled to an input of said first primary gate to control the state thereof, a second primary gate coupled to the reverse count input line of said second counter and to the forward count input line of said first counter circuit, a second control flip-flop gate having an input coupled to one of the counting steps of said second counter circuit and an output coupled to an input of said second primary gate to control the state thereof, a clock pulse source coupled to an input of said first and second primary gates with said first and second primary gates being normally closed to said clock pulse source, said first primary gate having an output coupled both to said first counter circuit and to a utilization device, and a trigger pulse source coupled to an input of said first flip-flop to operate it and thereby open said first primary gate to permit the clock pulse source to transmit pulses through it to said first counter circuit and to said utilization device, the output of said first counter circuit also being coupled to an input of said second gate to open it and permit the clock pulse source to transmit pulses to the second counter circuit to drive it to zero count and to the first counter circuit to drive it to the applied program count.

11. The system defined in claim 10 wherein each counter circuit includes a plurality of counting modules, each module having ten counting steps including steps from zero to nine, the zero step of each counter module being coupled to an input of each flip-flop gate.

12. The system defined in claim 10 wherein each counter circuit includes a plurality of counting modules, each module having ten counting steps including steps from zero to nine, the zero step of each counter module being coupled to an input of each flip-flop gate, and the nine-step of said first counter being coupled through a first series of gates to the reverse input line of said first counter and through a second series of gates to the forward input line of said first counter whereby the direction of flow of clock pulses to said first counter may be controlled.

13. The counter defined in claim 10 wherein all of said gates are NAND/NOR gates.

14. The system defined in claim 10 wherein the zero counting step of each counter module of said first and second counter circuits is coupled through its own gate to a common gate, the output of which is coupled to an input of said first and second flip-flop gates, respectively, whereby the state of each counter circuit can be coupled through its associated flip-flop to its associated primary gate.

No references cited.

DARYL W. COOK, *Acting Primary Examiner.*

J. F. MILLER, *Assistant Examiner.*